United States Patent Office 3,418,107
Patented Dec. 24, 1968

3,418,107
PRODUCTION OF IRON FROM ORES OF LOW
PARTICLE RELEASE SIZE
James W. Carr, Jr., Francis X. Mayer, and John F. Moser, Jr., Baton Rouge, La., assignors to Esso Research and Engineering Company, a corporation of Delaware
No Drawing. Filed Dec. 10, 1965, Ser. No. 513,101
8 Claims. (Cl. 75—26)

ABSTRACT OF THE DISCLOSURE

This invention relates to a process, the major advantage of which is that very finely divided ores of low release particle size, which are normally unsuitable for use in a fluidized iron ore reduction process, can be utilized if first reduced and then beneficiated. In the process, a low release size oxidic iron ore is progressively reduced in a series of staged fluidized beds to substantially metallic iron and then crushed or ground at elevated temperatures ranging above about 300° F. The reduced iron product is crushed to form mixtures wherein the largest particle sizes range from about 65 mesh, and finer, and often from about 150 mesh, and finer, preferably by jet attrition. By use of magnets, the metallic iron particles can be readily concentrated and recovered.

---

Considerable attention has been given, in recent years, to the treatment of finely divided iron ores. This is largely due to the increasing demand for iron and steel, because of diminishing iron ore reserves, and because of the availability of iron ores which, generally, are unsuitable for use in conventional iron ore reduction processes without expensive processing. Direct iron ore reduction processes, i.e., those processes wherein ores are directly contacted with reducing agents or gasses and metallized without melting the metal, have been regarded as potentially useful for directly utilizing ores which are often unsuitable for the more conventional processes.

Types of direct iron ore reduction processes which have been the subject of major attention are those characterized as fluidized iron ore reduction processes. A major advantage of these processes is that they are capable of utilizing relatively finely divided ores, e.g., ores containing substantial proportions of fines ranging in particle size from about 65 to about 325 mesh (Taylor series) without any necessity to pelletize, agglomerate or form larger masses from such particles. The amount of fines contained in an ore, however, can be so excessive that these cannot be utilized even in fluidized iron ore reduction processes. Thus, even fluidized iron ore reduction processes are not readily adaptable for use of ores wherein substantial amounts of the iron ore solids particles range below about 65 mesh in size. Where substantial quantities of such fines, particularly those ranging down to 325 mesh and finer, are present it is extremely difficult, inter alia, to reduce the ore and to maintain proper fluidization.

The charge or feed to, e.g., a direct fluidized iron ore reduction process is often one which has been beneficiated to obtain and concentrate the desirable iron-bearing minerals in particle sizes suitable for fluidization, and to separate and remove the undesirable mineral components of the ore. In the natural state, iron ores are thus quite complex but are nonetheless composed of two parts: a part which bears iron minerals in kind and amount suitable for recovery, and another part, i.e., the gangue, which contains iron (insoluble iron) or other minerals in kind and amount unsuitable for recovery. Beneficiation contemplates generally an initial crushing or grinding of hard, lumpy ores, and then a separation of the desirable iron-bearing minerals from the gangue. The different minerals fracture and are cleaved apart one type of particle from another, and can be separated from one another and the desirable minerals concentrated. The concentration steps can involve washing, screening, jigging, flotation and magnetic concentration, or any combination of these and other techniques. It also contemplates concentration of the desirable iron-bearing minerals by blending to provide acceptable iron contents.

Many ores readily yield to beneficiation to provide suitable iron ores for fluidized iron ore reduction processes. Such ores, however, are always those of relatively large release size, i.e., the size to which the ore must be ground to effectively separate iron ore from gangue. Ores of relatively small release size cannot be ground sufficiently to separate the ore from the gangue without excessive fines production, if indeed it is practical to provide adequate grinding at all. Even if adequately ground, it may be entirely too costly to pelletize or agglomerate such ores to increase particle size. Hence, ores of small release size are entirely unsuitable for use in fluidized iron ore reduction processes.

There is, then, despite the increasing demand for iron and steel, a wide variety of low grade, low release ores which cannot be used in direct iron ore reduction processes, particularly in fluidized iron ore reduction processes. Consequently, there is need in the art for processes or process combinations suitable for recovery of such ores.

The primary object of the present invention is, accordingly, to satisfy this need. In particular, it is the object of this invention to provide a new and improved process which will make feasible the more general and wide use of finely divided iron ores, particularly small release size ore. More particularly, it is the object of this invention to provide the art with simplified, new and novel fluidized iron ore reduction process combinations, especially those utilizing a series of staged reduction zones, wherein small release size iron-bearing ores containing substantial amounts of gangue can be reduced and subsequently treated to provide high purity iron, suitable in many instances for steel making without intermediate melting or purifying. It is also an object to provide a process combination wherein low grade ores can be beneficiated magnetically to remove major portions of gangue.

These and other objects are achieved in accordance with the present invention which contemplates the novel process combination wherein low release particle size iron-bearing ore is initially directly reduced, at least in part, to metallic iron, then subsequently crushed and ground to provide a mixture, and the iron separated therefrom, preferably by magnetic means, and then recovered.

In accordance with the present process, finely divided crude iron-bearing ores or iron ores of low release particle sizes are suitable for treatment with reducing gases. The particulate solids are contacted with the gases which diffuse through the individual particles, and the particulate ore solids are reduced. Preferably, the reduction is carried out in a fluidized iron ore reduction process to product a metallized product. The metallized product is then ground or crushed to provide a mixture of substantially metallic iron particles and gangue particles. Because the iron particles are magnetic and the gangue particles non-magnetic, magnetic separation and concentration of the iron particles offers a convenient and relatively cheap means of recovering the iron. The residual gangue is, conversely, also readily separated and concentrated, and can then be discarded.

The iron-bearing, low release size ore is preferably reduced to from about 50 to about 85 percent, and more preferably from about 85 to about 95 percent, and higher, metallic iron. Generally, the lower ranges of metallization are suitable wherein the iron product is to be used as, e.g., a charge to a blast furnace, but the higher metallizations are desirable where the iron is to be employed in the manufacture of high grade products, e.g., steel. In either event, the reduced iron product is then crushed or ground to release size, this often contemplating mixtures wherein the largest particle sizes range from about 65 mesh (Taylor series), and finer, and often from about 150 mesh, and finer. The finely ground product is then subjected to magnetic beneficiation. By use of a magnet, or magnets, the metallic iron particles can be readily concentrated and recovered. Generally, the particulate metal solids are compacted, preferably while hot, to form briquettes In a preferred embodiment the freshly reduced ore particles are subjected to crushing or grinding, while hot, to give particles as small as or smaller than the release size. This grinding action can be performed by generally conventional methods except that the grinding is performed at elevated temperatures, ranging generally above about 300° F. More preferably, however, the grinding is conducted by hot jet attrition or hot target attrition techniques. These latter techniques can be more readily conducted at elevated temperatures, particularly the most desirable elevated temperatures, and provide very fine particle sizes.

In accordance with either jet attrition or target attrition, the hot solids particles are picked up and carried by high speed fluid streams, preferably hot gaseous streams, and the particles impacted against one another or against other solid surfaces. The impact of the particles against one another or against other solid surfaces causes the particles to shatter and form smaller pieces. This does not, of course, preclude attrition of the particles by the action of the moving fluid streams themselves. Preferably, high speed gas streams moving at velocities ranging from about 300 feet per second to supersonic velocities are employed.

Jet attrition grinding can be provided by locating high velocity, high mass rate gas jets within the stage of the iron ore reduction process from which the final product is to be withdrawn, or by placing same in an auxiliary compartment. In any event, preferably, the reduced iron is maintained at temperatures ranging from about 1000° F. to about 1800° F., and more preferably from about 1200° F. to about 1600° F., during the grinding. Preferably, a portion of the reducing gas is used for accelerating the reduced iron particles but the grinding operation can be done in a separate or auxiliary vessel using nitrogen or some other inert gas to operate the jets.

Target attrition grinding is obtained by impacting the solids iron particles at the same high temperatures and at high velocities upon a suitable solid target. This can best be accomplished with reasonable efficiency by withdrawing the reduced ore through a suitable high velocity transfer line, accelerating the solids particles in a fluid stream and impacting them against a solid target. It is also generally preferable to utilize a portion of the reducing gas as the fluid accelerating medium. In either jet attrition or target attrition grinding the velocities of accelerating gases employed can be sonic or supersonic depending primarily upon the fineness of particle size desired. Velocities ranging from about 300 feet per second to about 2000 feet per second, and preferably from about 500 feet per second to about 1500 feet per second, are found satisfactory.

In a preferred combination, low release particle size oxidic iron ores, i.e., ores contining or consisting essentially of oxides of iron, are countercurrently contacted in a direct iron ore reduction process with an ascending gas such as carbon monoxide or hydrogen, or both, or mixtures of either or both of these with other gases, and reduced at elevated temperatures ranging generally from about 1000° F. to just below the sintering temperature of the ores, this being about 1800° F. for most ores. The low release particle size feeds, or charges, to such processes can be partially beneficiated to provide particulate oxidic ores, raw ores or select mixtures of iron-bearing minerals.

A more preferred combination contemplates a series of stages or zones each containing separate fluidized beds wherein the oxidic ore is sequentially contacted and successively reduced by the ascending gases, while components of the rising gases are oxidized. The ore is progressively reduced at it descends from one bed of the series of stages, or zones, to the next by overflow from one bed to the other.

In the separate stages, or zones, ferric oxide or hydrated form thereof is reduced, in ferric reduction zones, sequentially from ferric oxide to magnetic oxide of iron (magnetite) and thence from magnetic oxide of iron to ferrous oxide. The ferrous oxide is then reduced, in a ferrous reduction stage, or zones, to substantially metallic iron. One, or a plurality, of each of the ferrous reduction stages can also be employed. Preferably, temperatures range from about 1200° F. to about 1600° F. in the ferric reduction stages, and preferably in the ferrous reduction stage, or stages, should range no higher than about 1300° F. to about 1500° F. In accordance with this operation, the desired metallizations are readily obtained.

The product is then crushed or ground in situ, or withdrawn from the series of reduction stages, or zones, and crushed or ground to release size. Preferably, jet or target attrition methods are employed to grind the reduced ore while it is hot. The oxidic ores, now reduced to substantially metallic iron, become magnetic and readily separated from the gangue by magnetic means. The fineness in the post beneficiation, initially a detriment, now proves advantageous in briquetting and compaction. The iron concentrate is of high purity and suitable as a product for steel making.

The following nonlimiting examples are illustrative of the present invention.

The table below gives the results of magnetic separations performed on particulate metallized products from a variety of oxidic iron ores reduced in fluidized iron ore reduced processes. The iron ore products are first fluidized and reduced, then ground to form mixtures from which the magnetic portion is separated magnetically. The magnetic separations are performed in magnetic separators comprising a tubular vessel through which is charged an aqueous slurry of the particulate gangue solids and metallized solids. A pair of magnets are located within a restricted portion of a tubular vessel outside the tube and intermediate the terminal ends of a vessel wherein is provided the locations of entry and exit for the slurry. The vessel is continuously shaken to agitate and prevent settling of the particulate solids.

Application of the magnetic field across the restriction retains the magnetic particles in place and these can be easily and conveniently separated from the non-magnetic particles which exit from the vessel along with the fluid.

In the first column of the table is listed by letter designations several different types of ores reduced in the process; in the second column is listed for each specific ore a "total fraction" and the weight percent of the fraction which is magnetic; in the third column is given the average mesh size (Taylor series) of the particulate solids, before and after grinding; the fourth, fifth and sixth columns list the weight percent of the various ore components, before and after the crushing and separation—i.e., total iron (bound and unbound), iron present as metallic iron and silicates; and, the last column gives the amount of iron recovered in the separation, this being expressed as a percentage of the iron available for recovery.

| Ore | Fraction | Grind mesh size | Weight percent | | | Percent iron recovery |
|---|---|---|---|---|---|---|
| | | | Total iron | Metal iron | Silicates | |
| A | Total | (*) | 58.80 | 51.08 | 33.62 | |
| | Magnetic (60.6%) | −325 | 87.81 | 80.48 | 5.75 | 19 |
| B | Total | (*) | 85.23 | 71.17 | 6.61 | |
| | Magnetic (92.5%) | (*) | 92.55 | 73.86 | 0.43 | 100 |
| | Magnetic (92.3%) | −100 | 92.42 | 78.11 | 0.15 | 100 |
| C | Total | (*) | 55.26 | 47.82 | 31.36 | |
| | Magnetic (86.8%) | −200 | 72.06 | 62.90 | 19.78 | 100 |
| D | Total | (*) | 78.26 | 73.66 | 16.60 | |
| | Magnetic (90.3%) | −200 | 85.86 | 80.64 | 9.46 | 99 |
| E | Total | (*) | 89.62 | 82.21 | 5.80 | |
| | Magnetic (97.9%) | −325 | 89.01 | 72.09 | 3.50 | 97 |
| F | Total | (*) | 85.29 | 71.04 | 7.60 | |
| | Magnetic (97.6%) | −325 | 86.28 | 55.90 | 5.13 | 98 |
| G | Total | (*) | 51.65 | 29.52 | 22.37 | |
| | Magnetic (82.1%) | (*) | 60.18 | 28.97 | 12.86 | 96 |
| | Magnetic (73.0%) | −100 | 62.26 | 32.34 | 11.82 | 88 |
| | Magnetic (75.0%) | −325 | 62.82 | 32.09 | 13.45 | 91 |

*Before grinding.

It will be apparent that low release size, low grade ore can be successfully treated and the product can be upgraded tremendously.

When the foregoing examples are repeated, except that the solids are attrited in gas jets utilizing nitrogen gas at velocities of 1500 feet per second and at 1400° F., even better results are obtained.

The process is susceptible to various modifications and changes without departing the spirit and scope of the present invention.

The process combination of iron ore reduction and post-beneficiation provides a technique for processing low grade ores to high quality products. Post beneficiation utilizing high speed gas streams at elevated temperatures provides far more effective and efficient separation than can be obtained by use of aqueous mediums. The process can handle low grade ores which cannot otherwise be processed economically. Thus, it can handle ores which are entirely impractical to adequately beneficiate because, e.g., of the cost of grinding, beneficiating, and pelletizing to provide a quality ore suitable as a feed to a blast furnace. On the other hand, it can handle an ore wherein grinding of the product would make the particulate ore entirely unsuitable for feeding to, e.g., a fluidized iron ore reduction process. Such ore, however, can be preliminarily treated in the latter process and then subjected to magnetic beneficiation to provide high quality products.

Heretofore, magnetic ores (magnetite), naturally or artificially produced, were commonly beneficiated by a magnetic beneficiation process. Herein, however, since all low grade ores are first reduced to provide a metallized product, the product can be conveniently magnetically beneficiated.

The process combination can be used on raw ores or on semi-refined or semi-beneficiated ores. Thus, the process combination is applicable to, e.g., very low grade magnetite ores beneficiated to remove a major portion of the gangue materials prior to the fluidized iron ore reduction. This partial refining technique might be used, e.g., when the release size of the gangue particles is so small that only a very fine grinding could produce an ore of good quality. Hence, it may be desirable to concentrate the gangue portion and utilize this as a feed to the present process. Small release size gangue can also be concentrated by flotation beneficiation techniques and the concentrates utilized as feeds to the present process, or by a combination of magnetic beneficiation and flotation beneficiation. Flotation beneficiation is used, of course, where all or a portion of the low grade ores are non-magnetic.

Having described the invention, what is claimed is:

1. In a process for the production of metallic iron from oxidic iron ore containing both gangue and reducible iron-bearing minerals of sufficiently small release size that grinding to release size would render the ore unsatisfactory for use in a fluidized iron ore reduction process due to the excessive fineness of the particles, the combination comprising feeding said ore, without grinding, through a series of zones, contacting the ore within the zones with an ascending gas to fluidize and progressively reduce the ore in discrete ferric and ferrous reduction zones operated at temperatures ranging from about 1000° F. to about 1800° F., to produce a particulate product ranging from about 50 to about 95 percent, and higher, metallic iron, crushing and grinding the metallized product at elevated temperatures ranging above about 300° F. to release size wherein the largest particle sizes within the crushed mixture ranges from about 65 mesh and finer to separate metallic iron and gangue particles, and then magnetically beneficiating and recovering the metallic iron.

2. The process of claim 1 wherein the grinding of the metallized ore is accomplished by suspending the particulate metallized product in a fluid stream moving at high velocities, and impacted against a solid surface to produce attrition.

3. The process of claim 2 wherein the high speed fluid stream moves at velocities ranging from about 300 feet per second to supersonic velocities.

4. The process of claim 2 wherein the fluid stream moves at velocities ranging from about 300 feet per second to about 2000 feet per second.

5. The process of claim 4 wherein the attrition is conducted in an auxiliary zone adjacent the final ferrous reduction zone.

6. The process of claim 3 wherein the attrition is produced at temperatures ranging from about 1000° F. to about 1800° F.

7. The process of claim 6 wherein attrition is produced at temperatures ranging from about 1200° F. to about 1600° F.

8. The process of claim 1 wherein the whole particulate metallized product is attrited to particle sizes ranging from substantially about 150 mesh and finer.

References Cited

UNITED STATES PATENTS

| | | | |
|---|---|---|---|
| 1,800,856 | 4/1931 | Bradley | 75—35 |
| 2,287,663 | 6/1942 | Brassert | 75—3 |
| 2,990,269 | 6/1961 | Hyde | 75—26 |
| 2,996,373 | 8/1961 | Agarwal | 75—26 |
| 3,046,106 | 7/1962 | Hemminger et al. | 75—36 |
| 3,126,277 | 3/1964 | Smith | 75—33 |
| 3,202,502 | 8/1965 | Lean et al. | 75—1 |
| 3,246,978 | 4/1966 | Porter et al. | 75—26 |
| 2,175,457 | 10/1939 | Dunn | 241—5 |
| 3,173,620 | 3/1965 | Hunt | 241—284 |

L. DEWAYNE RUTLEDGE, *Primary Examiner.*

H. W. TARRING, *Assistant Examiner.*

U.S. Cl. X.R.

75—1, 34